United States Patent [19]

Veenhof

[11] Patent Number: 5,413,208
[45] Date of Patent: May 9, 1995

[54] CONVEYOR BELT SCRAPER BLADE

[75] Inventor: Willem D. Veenhof, El Cajon, Calif.

[73] Assignee: Martin Engineering Company, Neponset, Ill.

[21] Appl. No.: 269,568

[22] Filed: Jul. 1, 1994

[51] Int. Cl.$^6$ .............................................. B65G 45/12
[52] U.S. Cl. .................................................... 198/497
[58] Field of Search ............... 198/497, 499; 15/256.5, 15/256.51

[56] References Cited

U.S. PATENT DOCUMENTS

| | | | |
|---|---|---|---|
| 4,533,036 | 8/1985 | Gordon | 198/499 |
| 4,643,293 | 2/1987 | Swinderman | 198/497 |
| 4,658,949 | 4/1987 | Reicks | 198/497 |
| 4,787,500 | 11/1988 | Holz | 198/497 |
| 4,917,231 | 4/1990 | Swinderman | 198/497 |
| 5,197,587 | 3/1993 | Malmberg | 198/497 |
| 5,222,588 | 6/1993 | Gordon | 198/499 |
| 5,222,589 | 6/1993 | Gordon | 198/497 |
| 5,310,042 | 5/1994 | Veenof | 198/497 |

FOREIGN PATENT DOCUMENTS 2267072 11/1993 United Kingdom ............... 198/497
1234315 5/1986 U.S.S.R. ............................ 198/499

Primary Examiner—Cheryl L. Gastineau
Attorney, Agent, or Firm—Lee, Mann, Smith et al

[57] ABSTRACT

A conveyor belt scraper blade adapted for use in cleaning the surface of a conveyor belt. The scraper blade includes a resilient arm member extending between a lower base portion and an upper end portion. The arm member is adapted to pivot about an axis extending through the base portion. A scraping block is attached to the upper end portion of the arm member. The scraping block includes a front surface and a rear surface. The front surface extends between an upper scraping edge adapted to contact the surface of the conveyor belt and a spaced apart lower edge. The front surface is adapted to form an obtuse scraping angle with the surface of the conveyor belt. A restraining member extends substantially from the scraping edge to the arm member. The restraining member substantially prevents movement of the scraping edge with respect to the front surface and controls the amplitude of vibration of the scraper blade during use.

20 Claims, 1 Drawing Sheet

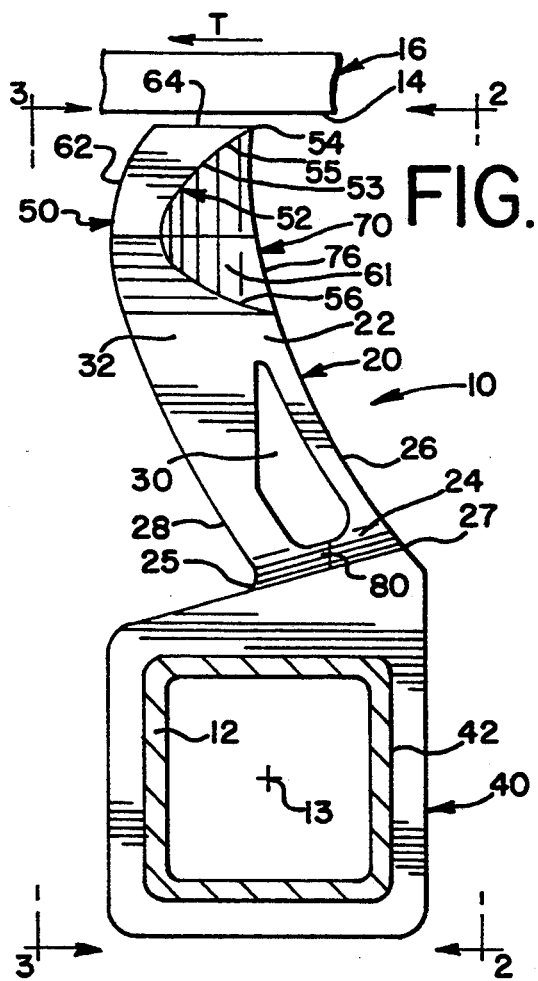
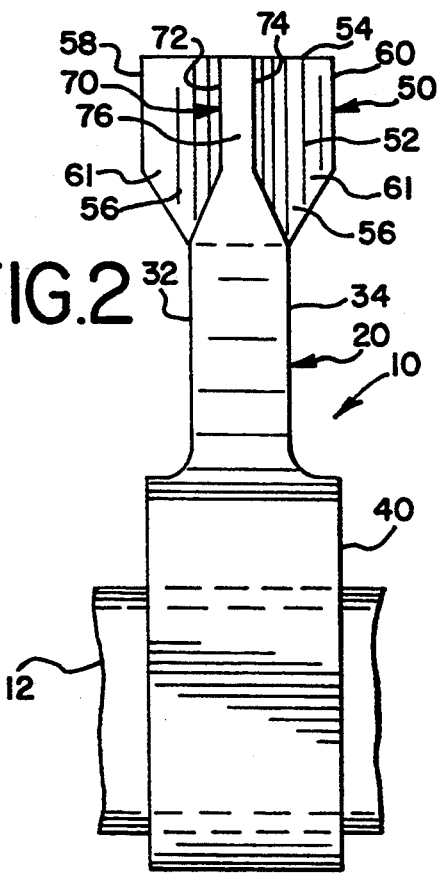
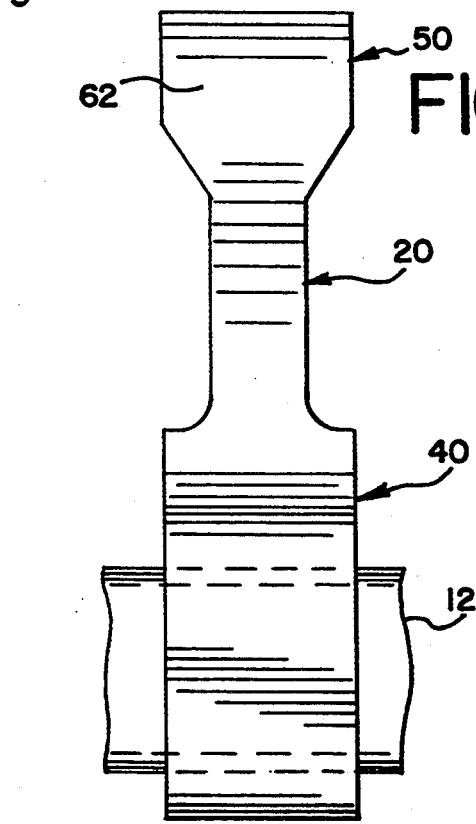
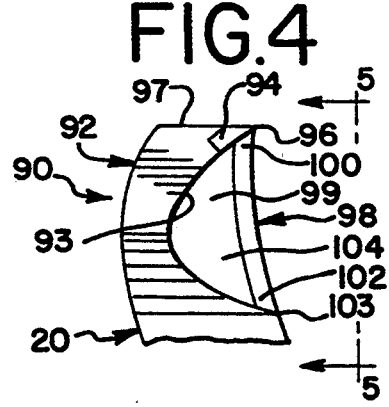
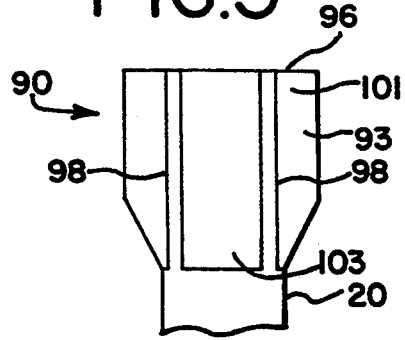

CONVEYOR BELT SCRAPER BLADE

BACKGROUND OF THE INVENTION

The present invention is directed to a scraper blade for use in a conveyor belt cleaner mechanism for the removal of adherent material from a conveyor belt, and in particular, to a scraper blade which includes a structure adapted to control or eliminate the amplitude of vibration of the scraper blade during use when the face of the blade is located at a right angle or an obtuse cleaning angle relative to the conveyor belt.

Scraper blades are used in conveyor belt cleaning mechanisms to remove material which adheres to the belt surface after the material has passed the material discharge point of the conveyor. The cleaning angle of a scraper blade, which is the angle between the surface of the conveyor belt and the face of the scraper blade which faces the oncoming belt, may be an acute angle of less than 90°, a right angle of 90°, or an obtuse angle of greater than 90°. As used hereinafter, "obtuse angle" shall include a right angle of 90°.

Scraper blades that operate at an acute cleaning angle tend to trap material between the belt surface and the scraper blade as the direction of movement of the adherent material must change by greater than 90° during removal. This action is often referred to as "scraping". A scraper blade operating at an acute cleaning angle may also separate from the belt surface due to an accumulation of trapped material between the blade and the conveyor belt, a condition known as "planing."

A scraper blade that operates at an obtuse cleaning angle is more efficient in removing adherent material from the belt as adherent material does not become trapped between the blade and the belt and as adherent material can be removed with a smaller change in the direction of travel of the adherent material than with a scraper blade having an acute cleaning angle. This action is often referred to as "peeling".

While an obtuse cleaning angle is preferable over an acute cleaning angle, and a resiliently mounted blade is preferable to a rigidly mounted blade, resiliently mounted scraper blades having an obtuse cleaning angle are subject to destructive and cleaning efficiency reducing vibration at the scraping edge of the scraper blade. When a scraper blade is engaged against the belt surface, a rotational moment is created in the scraper blade by the drag of the belt over the edge of the scraper blade. When pressed against a conveyor belt, with a predetermined force to generate a predetermined cleaning pressure, a resiliently mounted scraper blade having an acute cleaning angle will rotate in a direction away from the belt surface, thus reducing the drag force created by the belt. This results in a comparatively small rotation and consequently only a small change in orientation from the scraper blade's natural orientation, thus producing a relatively stable and constant relationship between the blade and the belt surface with little or no resulting scraper blade vibration.

A resiliently mounted scraper blade having an obtuse cleaning angle, and applied against the belt with the same predetermined cleaning pressure will rotate in a direction toward the belt surface, causing a reaction in the blade supporting mechanism which moves in a direction away from the belt surface thereby reducing the drag force, which immediately causes the resiliently mounted blade to snap back to its natural orientation allowing the blade support mechanism to rotate towards the belt surface and resume the predetermined cleaning pressure which causes the same cycle of action and reaction to begin all over again. This unstable fluctuating relationship between the blade and the belt surface is seen as vibration of the scraping edge of the scraper blade relative to the belt surface, which is undesirable.

Scraper blades having an obtuse cleaning angle have previously been used as shown in U.S. Pat. No. 4,787,500. Ribs and other devices have been used to strengthen the base of a scraper blade, but such reinforcements control vibration of the scraping edge by increasing rigidity, thus reducing resiliency, and thereby increasing the risk of damage to the conveyor belt and the belt cleaning device.

SUMMARY OF THE INVENTION

A conveyor belt scraper blade is adapted for use in a conveyor belt cleaner for cleaning the surface of a conveyor belt. The scraper blade includes a resilient arm member extending transversely between a lower base portion and an upper end portion. The arm member is adapted to pivot about an axis extending through the base portion of the arm member. A scraping member is attached to the upper end portion of the arm member. The scraping member includes a front surface and an opposing rear surface. The front surface forms a generally arcuate chamber extending between an inlet end having an upper scraping edge adapted to contact the surface of the conveyor belt and a spaced apart lower surface portion forming an outlet end. The front surface is adapted to form an obtuse scraping angle with the surface of the conveyor belt. A restraining member extends substantially from the scraping edge at the inlet end of the chamber to the lower surface portion at the outlet end of the chamber. The restraining member substantially prevents separation of the scraping edge and inlet end from the outlet end and lower surface portion of the front surface beyond a predetermined distance and controls the amplitude of vibration of the scraper blade during use.

DESCRIPTION OF THE DRAWINGS

FIG. 1 is a side elevational view of the scraper blade of the present invention shown mounted on a cross-shaft for engagement with a conveyor belt.

FIG. 2 is a front elevational view of the scraper blade taken along lines 2—2 of FIG. 1.

FIG. 3 is a rear elevational view of the scraper blade taken along lines 3—3 of FIG. 1.

FIG. 4 is a partial side elevational view of a modified embodiment of the scraper blade.

FIG. 5 is a front elevational view of the modified embodiment of the scraper blade taken along lines 5—5 of FIG. 4.

DESCRIPTION OF THE PREFERRED EMBODIMENTS

FIG. 1 shows the scraper blade 10 of the present invention mounted on an elongate cross-shaft 12 having a longitudinal axis 13 for scraping engagement with the surface 14 of the return run of a conveyor belt 16. The conveyor belt 16 is shown spaced slightly apart from the scraper blade 10 in FIG. 1 for purposes of illustration, however, the scraper blade 10 would normally be in scraping engagement with the surface 14 of the conveyor belt 16 during operation. The conveyor belt 16 travels in a direction shown by the arrow T. The cross-shaft 12 is shown as a rectangular tubular member, however, other configurations of cross-shafts may be used as desired for supporting one or more scraper blades 10 as part of a conveyor belt cleaner mechanism.

The scraper blade 10 includes a resilient arm member 20 having an upper end portion 22 and a lower base portion 24. The base portion 24 extends between a lower rear edge 25 and a lower front edge 27. The arm member 20 includes a front wall 26 and a spaced apart and opposing rear wall 28. The rear wall 28 is relatively strong in compression while the front wall 26 is relatively weak in compression compared to the rear wall 28. An aperture 30 extends transversely through the arm member 20 between the walls 26 and 28 from a first side wall surface 32 to a second side wall surface 34. The aperture 30 may have various different configurations as desired such as round, rectangular, triangular and variations thereof. The construction of the arm member 20 may be as generally described in U.S. Pat. No. 5,310,042 which is assigned to Martin Engineering the applicant herein. While the arm member 20 of the preferred embodiment includes an aperture 30 as shown in FIG. 1, the arm member 20 may also be formed without the aperture 30, if desired. The arm member 20 is resilient and is preferably made of an elastomeric material such as urethane.

The scraper blade 10 includes a mounting base 40 which is attached to the lower base portion 24 of the arm member 20. The mounting base 40 is shown in FIG. 1 as being generally rectangular with a rectangular aperture 42 extending transversely therethrough. The rectangular aperture 42 is adapted to fit closely around the rectangular cross-shaft 12 such that the mounting base 40 may slide longitudinally along the cross-shaft 12 but cannot rotate relative to the cross-shaft 12 about the longitudinal axis 13. Many other types of mounting arrangements other than the mounting base 40 shown in FIG. 1 may be used, as desired, to mount the arm member 20 to the cross-shaft 12. A plurality of scraper blades 10 may be mounted on the cross-shaft 12 adjacent to one another.

The scraper blade 10 also includes a scraping member 50 which is attached to the upper end portion 22 of the arm member 20. The scraping member 50 includes a front surface 52 having an upper surface portion 55 and a lower surface portion 56. The front surface 52 extends between an upper scraping edge 54 of the upper surface portion 55 and a lower edge of the lower surface portion 56. The front surface 52 faces the oncoming conveyor belt 16 to which material is adhered. As best shown in FIG. 1, the front surface 52 defines an arcuate wall 53 which is in the general shape of a parabola, however, the wall 53 may be circular, generally V-shaped or other configurations as desired. The upper surface portion 55 which extends from the scraping edge 54 is shown as being slightly curved, but may also be planar. The front surface 52 extends transversely, as shown in FIG. 2, between a left edge 58 and a right edge 60. The front surface 52 forms a generally arcuate chamber 61 defined by the wall 53. The chamber 61 has an inlet end at the scraping edge 54 adapted to receive material removed from the belt 16 and an outlet end at the lower surface portion 56 adapted to discharge the removed material from the chamber 61. The scraping member 50 also includes a rear surface 62 spaced apart from and opposed to the front surface 52. A generally planar upper surface 64 extends between the scraping edge 54 and the rear surface 62. The scraping edge 54 and the upper surface 64 are adapted to engage the surface 14 of the conveyor belt 16. Although the upper surface 64 is shown in FIG. 1 as generally horizontal and parallel to the surface 14 of the belt 16 when the scraper blade 10 is in its natural orientation, the upper surface 64 may be orientated in other positions as may be deemed desirable. For example, the upper surface 64 may extend from the scraping edge 54 upwardly or downwardly to the rear surface 62 at an angle to the horizontal.

As shown in FIG. 1, the upper surface portion 55, which adjoins the scraping edge 54, forms an oblique scraping angle with the surface 14 of the conveyor belt 16 providing all of the advantages previously discussed for operation in the peeling mode. The scraping member 50 is resilient and is preferably made of an elastomeric material such as urethane. It is preferred that the aperture 30 in the arm 20 be located as shown in FIG. 1 entirely to the front side of a line extending between the scraping edge 54 and the lower rear edge 25 of the base portion 24 of the arm 22.

The scraper blade 10 also includes a restraining member 70. The restraining member 70 shown in FIGS. 1 and 2 is in the form of a rib having a left side surface 72, a right side surface 74, and an outer surface 76 extending therebetween. The restraining member 70 is attached at its upper end to the upper surface portion 55 of the front surface 52 adjacent the scraping edge 54 at the inlet end of the chamber 61 and extends downwardly along the lower surface portion 56 of the front surface 52 and is attached at its lower end to the lower surface portion 56 of the front surface 52 adjacent the outlet end of the chamber 61. The restraining member 70 prevents separation of the inlet end from the outlet end beyond a predetermined distance which is the distance between the ends when the blade is not engaged against the belt. This effectively controls vibration of the scraper blade during operation. As best shown in FIG. 1, the outer surface 76 of the restraining member 70 extends substantially between the scraping edge 54 and the arm member 20 along a path which is slightly curved but which may be substantially linear. The outer surface 76 of the restraining member 70 preferably forms a right angle or an acute cleaning angle with the surface 14 of the belt 16.

The restraining member 70 is preferably made of an elastomeric material such as urethane. The restraining member 70 must be able to resist any substantial elongation under tensile working loads. The scraper blade 10 may include a plurality of restraining members as illustrated in FIG. 5. Although the restraining member 70 is shown as being external to the scraping member 50, the restraining member may comprise a rigid member such as a plate (not shown) which is embedded in the scraping member 50 and which extends from adjacent the scraping edge 54 to the lower surface portion 56.

In operation, the scraping edge 54 and the upper surface 64 of the scraper blade 10 illustrated in FIGS. 1–3 are pressed into scraping engagement with the surface 14 of the conveyor belt 16. If the upper surface 64 of the blade 10 is formed at an angle extending upwardly from the scraping edge 54, rather than extending horizontally and parallel to the belt 16 as shown in FIG. 1, the arm member 20 will flex as the blade 10 is pressed into engagement with the belt 16 allowing the upper surface 64 to rotate to a position where the upper surface 64 is parallel to and in engagement with the belt 16. If the upper surface 64 is formed at an angle extending downwardly from the scraping edge 54, only the scraping edge 54 and a portion of the upper surface 64 adjacent to the scraping edge 54 may be in engagement with the belt 16. As the belt 16 drags across the scraping edge 54, the scraping member 50 and arm member 20 will resiliently pivot about an axis 80 which extends transversely through the lower base portion 24 of the arm member 20. It is preferred that the scraping edge 54 be located behind the axis 80 such that a line extending through the scraping edge 54 and the axis 80 will form an acute angle with the surface 14 of the conveyor belt 16.

During operation the scraping edge 54 and inlet end of the chamber 61 are prevented by the restraining member 70 from separating from the lower surface portion 56 and outlet end of the chamber 61 beyond a predetermined distance. The restraining member 70 substantially prevents movement of the scraping edge 54 and inlet end of the chamber 61 in either a direction away from or a direction towards the lower surface portion 56 and outlet end of the chamber 61 and thereby substantially prevents movement of the scraping edge 54 with respect to the wall 53 and maintains the profile of the wall 53 substantially uniform during use. The restraining member 70 thereby controls the amplitude of vibration of the scraping edge 54 of the scraper blade 10. Although vibration may be completely eliminated, some amplitude of vibration may be desirable in certain situations such as where the materials being conveyed tend to stick to the blade. In such a situation some amplitude of vibration may be desirable to shed the blade of these sticky materials. This can be accomplished by varying the configuration and design of the restraining member 70 to allow limited separation of the scraping edge 54 from the lower surface portion 56 during use beyond the predetermined distance.

FIGS. 4 and 5 show a scraper blade 90 which is a modified embodiment of the scraper blade 10. The scraper blade 90 includes a mounting base 40 and an arm member 20 as in the scraper blade 10 illustrated in FIGS. 1-3. The scraper blade 90 includes a scraping member 92 which is similar to the scraping member 50 except that the scraping member 92, as shown in FIG. 4, includes a scraping element 94 located in an upper portion of the front surface 93. The scraping element 94 forms a scraping edge 96. The scraping element 94 may alternatively be attached to the upper surface 97 of the scraping member 92. The scraping element 94 is preferably made of a material which is harder than that of the scraping member 92. The scraping element 94 is preferably made from a hard metal such as tungsten carbide. The scraping element 94 provides increased abrasion resistance to reduce wear of the scraper blade from scraping engagement with the belt 16.

The scraper blade 90 includes a pair of restraining members 98 and an arcuate chamber 99. Only one restraining member 98, or more than two restraining members 98, may be used if desired. Each restraining member 98 is an elongate member having an upper end 100 and a lower end 102. The upper end 100 is attached to the upper surface portion 101 of the front surface 93 of the scraping member 92, or to the scraping element 94, adjacent the scraping edge 96 at the inlet end of the chamber 99. The lower end 102 is attached to the outlet end of the chamber 99 at the lower surface portion 103 of the front surface 93 and to the arm member 20. As best shown in FIG. 4, an aperture 104 is formed between the restraining members 98 and the center portion of the front surface 93. The restraining members 98 may be formed from a web of elastomeric material such as urethane, or may be made from other materials such as steel chain or cable. As with the restraining member 70, the restraining members 98 must be able to resist any substantial elongation under tensile working loads.

The scraper blade 90 operates in substantially the same manner as the scraper blade 10. The scraping edge 96 and inlet end of the chamber 99 is prevented by the restraining members 98 from separating from the lower surface portion 103 and outlet end of the chamber 99 beyond a predetermined distance. The restraining members 98 thereby control the amplitude of vibration of the scraping edge 96 of the scraper blade 90.

Various features of the invention have been particularly shown and described in connection with the illustrated embodiments of the invention, however, it must be understood that these particular arrangements merely illustrate, and that the invention is to be given its fullest interpretation within the terms of the appended claims.

What is claimed is:

1. A conveyor belt scraper blade adapted for use in cleaning the surface of a conveyor belt, said scraper blade including a base; a scraping member associated with said base, said scraping member including a rear surface and a front surface, said front surface including an upper edge and a spaced apart lower surface portion; and a restraining a restraining member associated with said front surface extending from a position adjacent said upper edge to said lower surface portion, said restraining member substantially preventing movement of said upper edge in a direction away from said lower surface portion, said restraining member controlling the vibration of said scraper blade during use.

2. The conveyor belt scraper blade of claim 1 wherein said restraining member comprises a rib attached to said front surface extending between said upper edge and said lower surface portion.

3. The conveyor belt scraper blade of claim 1 wherein said restraining member comprises an elongate member extending between a first end and a second end, said first end being attached to said front surface adjacent said upper edge and said second end attached to said lower surface portion.

4. The conveyor belt scraper blade of claim 3 wherein said elongate member comprises a web of elastomeric material.

5. The conveyor belt scraper blade of claim 3 wherein said elongate member comprises a chain.

6. The conveyor belt scraper blade of claim 3 wherein said elongate member comprises a cable.

7. The conveyor belt scraper blade of claim 1 including a plurality of restraining members.

8. The conveyor belt cleaner of claim 1 including an arm member extending between said base and said scraping member.

9. The conveyor belt cleaner of claim 8 wherein said arm member is made from a resilient material.

10. The conveyor belt scraper blade of claim 8 wherein said arm member includes a first wall which is relatively strong and a second wall which is directly opposed to said first wall and which is relatively weak compared to said first wall.

11. The conveyor belt scraper blade of claim 10 including an aperture extending within said arm member between said first wall and said second wall.

12. The conveyor belt scraper blade of claim 11 wherein said aperture is located to one side of a line extending through said upper edge and through a rear edge of a base portion of said arm member.

13. The conveyor belt scraper blade of claim 1 including a scraping element associated with said scraping member.

14. A scraper blade for cleaning a conveyor belt including a base adapted for mounting on a support shaft, a scraping member associated with said base and adapted to engage the conveyor belt for removing adherent material, said scraping member including a rear surface, a front surface forming a generally arcuate chamber defined by a generally arcuate wall, said chamber having an inlet end and an outlet end, said arcuate chamber adapted to receive material removed from the conveyor belt at said inlet end and to discharge the material at said outlet end, a scraping edge associated with said front surface adjacent said inlet end of said arcuate chamber, and a restraining member extending between said inlet end and said outlet end of said arcuate chamber to prevent separation of said inlet end from said outlet end beyond a predetermined distance, thereby controlling vibration of said scraper blade during operation.

15. The scraper blade of claim 14 wherein said restraining member comprises a rib associated with said arcuate wall extending between said inlet end and said outlet end of said arcuate chamber.

16. The scraper blade of claim 14 wherein said restraining member comprises an elongate member extending between a first end and a second end, said first end being associated with said inlet end of said arcuate chamber and said second end being associated with said outlet end of said arcuate chamber.

17. The scraper blade of claim 14 including an aperture formed between said restraining member and said front surface of said scraping member.

18. The scraper blade of claim 14 including a support arm extending between said base and said scraping member.

19. A conveyor belt cleaning arrangement for cleaning the surface of a conveyor belt including a base; a scraping member associated with said base, said scraping member including a rear surface and a front surface, said front surface including an upper surface portion having an upper scraping edge and a lower surface portion, said upper surface portion forming an obtuse cleaning angle with the surface of the conveyor belt; and a restraining member associated with said front surface extending from a position adjacent said upper scraping edge to said lower surface portion, said restraining member substantially preventing movement of said scraping edge in a direction away from said lower surface portion, said restraining member controlling the vibration of said scraper blade during use.

20. The conveyor belt cleaning arrangement of claim 19 including an arm member extending between said base portion and said scraping member.

* * * * *